United States Patent Office 3,474,023
Patented Oct. 21, 1969

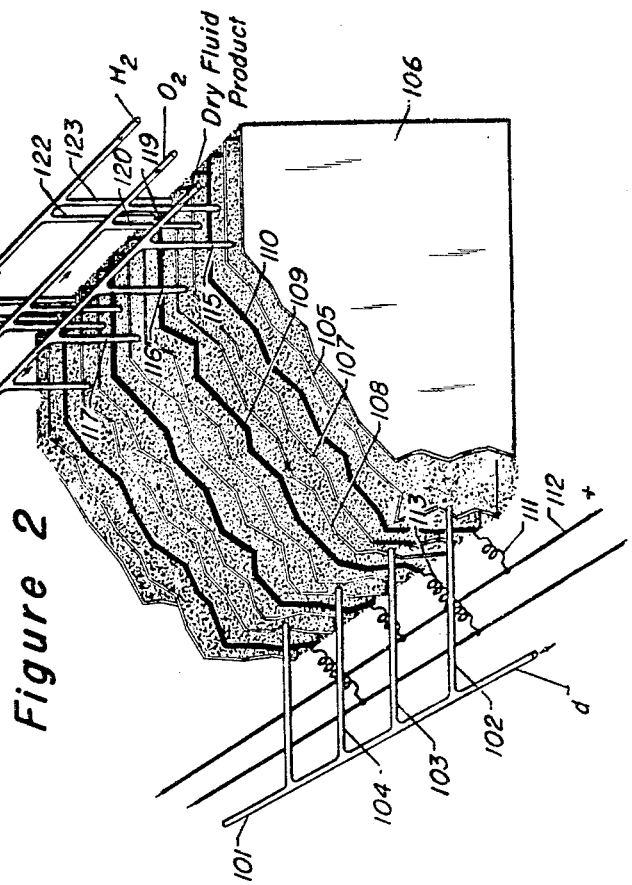
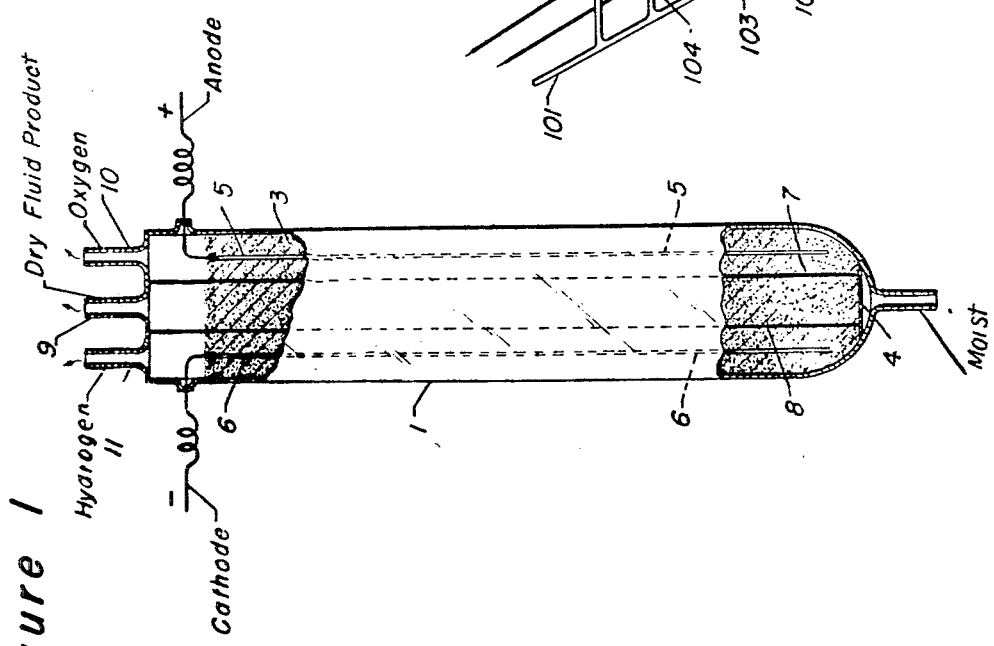

3,474,023
APPARATUS FOR CONTINUOUS DRYING OF MOIST FLUIDS
Herman S. Bloch, Skokie, Ill., assignor to Universal Oil Products Company, Des Plaines, Ill., a corporation of Delaware
Original application Nov. 29, 1962, Ser. No. 240,925, now Patent No. 3,313,718. Divided and this application Dec. 27, 1966, Ser. No. 604,738
Int. Cl. C22d 1/02; C01b 13/04
U.S. Cl. 204—265                10 Claims

ABSTRACT OF THE DISCLOSURE

An apparatus for continuous drying of moist fluids having a mass of electrically conductive desiccant, a pair of direct current electrodes and a pair of sheets of polymeric material to separately recover the dried fluid, hydrogen and oxygen.

---

This application is a division of copending application Ser. No. 240,925 filed Nov. 29, 1962 now Patent No. 3,313,718.

This invention relates to an apparatus for drying liquids and gases. More specifically, this invention concerns a fluid drying apparatus wherein a stream of moist fluid is contacted with a mass of solid desiccant particles at conditions which result in the absorption of water from the feed stock, forming an ionic solution on the surface of the desiccant particles, and the absorbed water is electrolyzed continuously by means of direct current applied through electrodes submerged in the mass of desiccant to recover separately gaseous hydrogen and oxygen from the mass of desiccant.

The problem of drying large volumes of fluids at a rapid rate is particularly pressing in the operation of petroleum refineries in which large quantities of hydrocarbon fluids are handled daily (often running into hundreds of thousands of gallons or cubic feet per day) and in many instances these streams must be dried to low water contents (measured in units of "parts per million") via intermediate dehydration of feed streams of conversion products in order to maximize product yields or to yield products of maximum value to the refiner. Thus, in the process in which ethylene is polymerized in the presence of an alkali metal catalyst, or in the presence of aluminum trialkyls or titanium tetrachloride, in the alkylation of isoparaffins with olefins utilizing anhydrous aluminum chloride or substantially anhydrous hydrogen fluoride alkylation catalyst, in the isomerization of normal butane to isobutane in the presence of anhydrous aluminum chloride, in the double bond position-isomerization of olefins such as dodecene employing an alkali metal catalyst, in the hydrogenation of benzene to cyclohexane with hydrogen in the presence of an alumina-supported nickel or platinum catalyst, and in the conversion of a host of other gaseous or liquid hydrocarbons to provide specialty intermediates and products the use of substantially dry feed stocks is a necessary prerequisite to the realization of commercially feasible conversion rates. In each of the foregoing types of conversions and for many others involving hydrocarbon feed stocks the yield of the desired product and the life of the catalyst are substantially increased by pretreatment of the feed stream to reduce the moisture content of the stream to a low level. The increase in the yield of product which accompanies such reduction in the water content of the charging stock in many instances more than compensates for the cost of drying the charging stock with chemical drying agents. Although the problem of drying hydrocarbon fluids on a continuous basis is a typical large scale application of the present apparatus because of the large volumes of the hydrocarbon streams utilized in the petroleum industry, the apparatus is not limited to the treatment of hydrocarbon streams exclusively, but generally to all fluid streams (whether normally liquid or gaseous) which are essentially non-reactive with the particular desiccant involved in the apparatus. Thus, moist streams such as air, nitrogen, carbon monoxide, carbon dioxide, halogen-substituted hydrocarbon such as Freon, chlorobenzene, and others are nonreactive with appropriate inorganic desiccants and may be utilized as feed stocks in the present apparatus.

Typical known drying agents adaptable for use in the present apparatus for desiccating fluid streams which are inert in the presence of the desiccating agent are such solid materials as anhydrous calcium chloride granules, anhydrous sodium sulfate, sodium hydroxide and potassium hydroxide pellets, soda-lime in pelleted form, porous adsorbent particles of siliceous adsorbents infused with concentrated sulfuric and/or phosphoric acids (such as the material commonly known in the refining arts as "solid phosphoric acid"), or with desiccant salts, dehydrated silica gel and alumina gel particles as well as a variety of other pelleted, flaked, or shipped solid materials which exist in the anhydrous state in contact with fluids only at extremely low partial pressures of water. These materials, however, when utilized as desiccants until "spent" or to the point of exhausting their dehydrating capacity, form a mass of wet, soggy particles, generally caked into larger agglomerates having a separate "solution" phase on at least the exterior surface of the desiccant particles. The resulting "spent" desiccants create a formidable disposal problem or a problem of reconstituting the water-saturated chemicals by heating or other treatment to dehydrate and restore the recovered desiccant to its particulate form having desiccant capacity. In addition to such operating costs of handling chemical desiccants by the customary, known methods the equipment in which the drying operation is effected is subjected to extreme corrosion conditions because of the highly corrosive character of chemical desiccant-water mixtures.

In the present drying apparatus, on the other hand, a given quantity of the chemical desiccant, such as any of the above mentioned particulate desiccants, is charged into the drying apparatus of this invention in its anhydrous or nearly anhydrous form, followed by the introduction of the fluid feed stock into the drying unit. Desiccation of the fluid stream flowing through the mass of desiccant particles occurs immediately. Before any loss in the porous, open structure of the bed of disiccant particles occurs as a result of the absorption of water from the fluid feed stream, direct current is supplied continuously or intermittently to the anodic and cathodic electrodes embedded in the mass of desiccant particles to thereby electrolyze the water recovered from the fluid feed stream and to regenerate the desiccant as drying proceeds. Thus, a single charge of the chemical desiccant, continuously maintained in desiccanting capacity, is utilized in the present process. The use of the initial charge of desiccant may be continued indefinitely, since at no time during its use does the mass of particles become soggy or lose its porous structure, and even if the electrical current is charged into the electrodes intermittently, the water content of the desiccant is maintained at a relatively low average level to provide desiccation of maximum efficiency and with minimum corrosion of the apparatus and equipment utilized in the present process. Electrical energy is preferably supplied continuously to the electrodes in order to stabilize the water content of the desiccant to a continuously low level, but even when such current supply is intermittent, the "off" period of the "on-off" cycle is brief, preferably of not greater than one-half of each on-off cycle.

The primary object of the process of this invention, therefore, is to provide an apparatus for the desiccation of fluids in which the foregoing advantages and improvements are realized. Another object of this invention is to provide an apparatus for the continuous desiccation without substantial interruption in the flow of moist fluid feed stock into the apparatus and at a constant flow of dry fluid product from the apparatus.

In one of its embodiments, this invention relates to a drying apparatus comprising an enclosure of dielectric material forming an electrolytic cell, a mass of solid particulate desiccant within said cell, and inlet for moisture-containing fluid at one end of the cell and an outlet for desiccated fluid at the opposite end of the cell, a pair of direct current electrodes in said mass of desiccant and means for impressing thereon a direct current electrical potential at sufficient electromotive force to electrolyze moisture sorbed by the desiccant from said fluid, means within said cell and mass of desiccant for maintaining the resultant hydrogen and oxygen separated from each other and from the desiccated fluid, a second outlet for hydrogen at said opposite end of the electrolytic cell, and a third outlet for oxygen at said opposite end of the cell.

The desiccant packed into the drying apparatus through which the electrical current is carried during the drying operation is largely dependent for its effectiveness on the size of the individual particles. The external dimensions of the desiccant particles not only determine the surface exposed to the fluid stream, and therefore, the efficiency of drying, but the particle size also determines the rate of electrolysis and the rate of transport of the water removed from the stream of fluid being treated as feed stock to the process. Thus, drying efficiency and rate of electrolysis varies inversely with the size of the desiccant particles. On the other hand, the flow rate of the feed stream through the apparatus also varies inversely with the size of the particles and becomes impractically low when the particles of desiccant are less than about 40 mesh in size, because resistance to the flow of fluid through the mass of desiccant particles becomes excessive as the size of the particles is reduced to less than about 40 mesh per inch, especially when the fluid feed stock is a liquid, such as a liquid hydrocarbon. The particles of desiccant must nevertheless be small enough to contact each other and a sufficient proportion of the electrode surfaces to provide a continuous path for the transport of ions and the flow of electrical energy from one electrode to the desiccant particles, through the mass of desiccant to the oppositely charged electrode. In general, resistance to the flow of direct current through a mass of particles varies inversely with the proportion of electrode surface in contact with the desiccant particles and this proportion increases as the desiccant particles are reduced in size. From the standpoint of efficiency in the use of electrical energy, the size of the desiccant particles should be as small as feasible, consistent with a practical and operable range of feed inlet flow rates. Generally, the lower limit in the size of the desiccant particles is about 40 mesh per inch and the upper limit, about 5 mesh per inch, for the foregoing reasons. The type of desiccant and the size of the desiccant particles is also dependent upon whether liquid or gas phase operation is to be utilized in the drying process, liquid phase operation generally requiring larger particles of desiccant in order to permit equivolumetric flow of the relatively more viscous liquid through the drying bed. It is also generally perferable to employ desiccant particles of substantial uniformity in size to thereby minimize channeling of the fluid stream flowing through the mass of desiccant particles.

The desiccant or drying agent used in the present apparatus as packing in the fluid-drying apparatus is characterized generally as an ionizable, inorganic substance in particle form which in its anhydrous or partially hydrated condition reduces the partial pressure of the water contaminant in the fluid feed stock and which by virtue of such reduction in the partial pressure of the water contaminant produces the present dehydrated fluid product. Many suitable desiccants in particle form utilizable in the present apparatus are selected from certain general categories of material: the hydroscopic solids as well as hygroscopic liquids infused into porous solids and certain water-reactive chemicals which are capable of being restored by electrolysis to their reactive condition. Thus, typical representative materials for use as particulate desiccants herein include the aforementioned flaked or powdered anhydrous metal salts such as calcium chloride, anhydrous alkalies such as potassium hydroxide and sodium carbonate, certain concentrated mineral acids having low vapor pressures, such as sulfuric or phosphoric acid infused into porous adsorbent particles, and certain adsorbents such as silica and alumina gels which although not usually classified as "ionic" materials, nevertheless become slightly acidic in the presence of adsorbed water and thus become electrically conductive and "ionizable" for use in the present drying process. Such highly absorbent granular solids may, furthermore, be made more conductive by impregnation or coating with ionizable salts, preferably desiccant salts. The desiccants referred to herein as water-reactive chemicals which are restored to their dehydrated condition by electrolysis are, for example, barium oxide (which hydrolyzes to barium hydroxide) deposited on the surface of or composited with inert solid particles of a structurally stable supporting material, such as alumina, etc.

Another class of particulate materials utilizable herein as desiccants according to the present apparatus and which are capable of reducing the partial pressure of water in a fluid contacted therewith are the materials referred to in the art as the dehydrated "molecular sieves." These substances, in general, have compositions corresponding empirically to metal aluminosilicates formed under natural conditions in the form of certain zeolites, such as chabazite and fuajasite, and under certain synthetic conditions in the form of synthetic zeolites referred to as "Type A" and "Type L" molecular sieves in various references, such as the paper entitled: "Molecular Sieves" by D. W. Break et al. published in Scientific American, January 1959, pp. 85–94, U.S. Patent No. 2,306,610, issued to R. M. Barrer and U.S. Patent Nos. 2,882,243 and 2,288,244, issued to R. M. Milton, as well as other publications in the prior art. Molecular sieves are essentially dehydrated metal aluminosilicate crystals which exist in the form of finely divided crystals. In order to provide a useful material which can be handled in a large-scale process, the fine crystals are mixed with a porous clay and pelletted into large composites. The methods of preparing, pelletting and using such materials are referred to and described in the foregoing publications.

Other solid, particulate drying agents of the type referred to as adsorbents and utilizable in the present process as the source of particulate disiccant are the dehydrated, activated clays and infusorial earths such as montmorillonite, Attapulgus clay, fuller's earth, kieselguhr, etc., pilled or pelletted into particles of the preferred size range utilized in the present apparatus.

The impressed voltage on the electrodes immersed in the mass of desiccant particles varies with the distance between the electrodes and the resistance to the flow of current, as determined by the size of the disiccant particles, the amount of water absorbed into the desiccant, and the chemical composition of the desiccant with respect to its content of ionizable groups. The voltage of the electrical energy supplied to the process and applied at the electrodes and the current density also sharply increase with the degree of dehydrogenation required.

Water absorbed on the desiccant during the course of the drying operation is decomposed by continuous electrolysis at the surfaces of the anodes and cathodes in contact with the desiccant and comprising the drying apparatus. Accordingly, the desiccant nearest the electrodes is maintained via electrolysis in a state of minimum water content during the drying operation, increasing to a maximum at a point midway between the electrodes; as drying continues, water continuously migrates from the central portions of the mass of desiccant lying between oppositely charged electrodes as the water equilibrium with the desiccant is constantly disrupted during the drying process via continuous electrolysis at the electrode surface. The desiccant never actually attains equilibrium with water in the feed stream at the electrode surfaces as long as the rate of electrolysis (as determined by current density and voltage) continuously converts the absorbed water into gaseous oxygen and hydrogen and the oppositely charged electrodes are maintained separate and apart, which in turn assure that the electrolytic decomposition of water is maintained as an irreversible conversion; as long as these factors obtain during the drying process, the desiccant immediately adjacent to the electrode surface is maintained in a substantially anhydrous condition, capable of maintaining the concentration drive necessary to obtain migration of water and its ions from the center of the desiccant bed toward the electrodes.

The distance between the electrodes determines the voltage required to operate the drying apparatus, but generally, such distance should not exceed 3 to 4 inches and in most instances should be substantially less, preferably, of the order of from about 0.2 to about 1.5 inches. The use of membranes between the mass of desiccant through which the main stream of hydrocarbon fluid is passed and the surfaces of the oppositely charged electrodes, which do not permit the passage of hydrogen and oxygen gas molecules into the mass of desiccant between the membranes but which allow the migration of ions, permits the construction of especially efficient drying units in which the distance between electrodes is maintained at a minimum, while permitting the oxygen and hydrogen gases formed by electrolysis of the water of desiccation to be removed from the apparatus in separate streams, separate also from the stream of dried fluid product. The design and construction of such apparatus is referred to in greater detail in the following description of the accompanying diagrams.

The apparatus in which electrolysis of the water of dehydration is effected comprises any suitable arrangement of electrodes, fluid feed inlets, separate hydrogen and oxygen outlets and dry fluid product outlets which will accomplish the objectives of this invention. One of the necessary apparatus requirements inherent in the manner of separation provided in the present process, arises from the necessity that the hydrogen and oxygen products formed continuously by electrolysis of the water absorbed from the fluid feed stock stream by the desiccant be removed continuously in separate streams to prevent their recombination in the downstream portion of the process flow and thereby reintroduce the moisture withdrawn from the fluid feed stream in the upstream portions of the desiccant, as well as to prevent the formation of an explosive mixture. FIGURE 1 of the accompanying diagram illustrates in simplified form a suitable arrangement of apparatus for accomplishing the foregoing objective of the process, depicting generally a cross-sectional view of an electrolytic cell for drying a continuous feed stream of moist fluid. FIGURE 2 is an isometric, shattered view of an arrangement of a number of such unit cells placed side by side in a surrounding enclosure whereby parallel flow of the feed inlet and product outlet streams is obtained and the capacity of the apparatus for a given quantity of desiccant is increased. The principles of operation involved in the process, illustrated in simplified form in FIGURE 1 also held true in the multiple-cell unit illustrated in FIGURE 2.

Referring to FIGURE 1, a unit cell of a simplified fluid drying apparatus is shown, comprising cell enclosure 1, here illustrated as an elongated tube of dielectric material, such as glass or other generally electrically non-conductive material having a shape which provides an extended path of flow between the moist fluid feed stream inlet 2 at one end of the electrolytic cell and the dry fluid product and electrolytic gas product outlets at the other end of the electrolytic cell (illustrated in FIGURE 1 at the top of a vertical cell). A solid, particulate desiccant 3 is packed within the cell enclosure throughout a major portion of the path of fluid flow, the mass of desiccant particles serving as a fluid-solid contacting zone having sufficient porosity to permit the flow of fluid feed stock through the cell without undue pressure drop between the feed inlet and product outlets. A screen 4 may be placed over the fluid inlet to suspend the particles of solid desiccant above the opening of the fluid inlet into the cell.

Cathode and anode plates providing the oppositely charged electrodes for introducing electrical current into the bed of particulate desiccant are immersed in separated relationship to each other within the mass of desiccant particles which surrounds the electrode plates and provides an intermediate, electrically conductive mass of ionizable material capable of conducting the electrical current impressed on the electrodes across the space between the oppositely charged electrodes. The positively charged anode, here designated by the numeral 5 and the negatively charged cathode, designated by numeral 6, each extend through the mass of desiccant particles for substantially the entire flow path of the fluid stream through the cell, thereby utilizing the anode and cathode surfaces at maximum efficiency. The electrodes are fabricated from a suitable electrically conductive material which is substantially inert to the hydrogen and oxygen gases emitted from the surface of the electrode plates and also chemically inert to the desiccant maintained in contact with the plates during the continuous operation of the drying unit, as well as inert to the acidic and basic environments which develop around the electrodes as the reaction proceeds. The requirement that the electrodes resist chemical reactivity with the desiccant is an especially significant factor in the choice of electrode composition, since the desiccant, including the particles adjacent to and in contact with the electrodes, acquires a film of moisture during the drying operation which becomes highly corrosive in the presence of a chemically reactive electrode.

One of the minimal flow requirements of the present apparatus is that the oxygen and hydrogen gases liberated from the surface of the anode and cathode, respectively, during continuous electrolysis of the water absorbed by the desiccant from the fluid feed stream are maintained separate and apart along the entire flow path of the feed stream through the bed of desiccant. These gases, if mixed, readily recombine to form water, sometimes explosively, thereby defeating the purpose of the process. One means of maintaining the hydrogen and oxygen streams separated during the course of the electrolysis is illustrated in FIGURE 1 in which the electrodes are maintained at a spaced, preferably parallel relationship to each other and ion-permeable membranes or diaphragms 7 and 8 are placed in the bed of desiccant particles between oppositely charged electrodes, the desiccant being packed between the substantially parallel surfaces of the membranes and electrodes in such manner that the particles are in relatively intimate contact with these surfaces and provide a continuous path for the flow of direct current and migration of ions between electrodes. In a preferred arrangement of the foregoing elements of the apparatus, diaphragm 7 most closely adjacent to electrode 5 (the anode) is placed more closely contiguous to electrode 5 than to electrode 6 and diaphragm 8 is placed more closely contiguous to cathode 6 than to anode 5, thereby providing a channel containing desiccant particles between the substantially parallel surfaces of diaphragms 7 and 8 through which the feed stream flows from inlet 2 at one end of the cell to fluid outlet 9 at the opposite end of the resulting channel. For this purpose parallel diaphragms 7 and 8 are sealed at one end around the fluid feed stock inlet to thereby prevent the flow of fluid into the space occupied by the desiccant between diaphragm 7 and electrode 5 or the space between diaphragm 8 and electrode 6. Similarly, diaphragms 7 and 8 are preferably sealed around the dried fluid product outlet 9 at the downstream end of the fluid flow path. In this manner the feed stream is precluded from entering the portion of the cell through which a relatively pure stream of oxygen liberated from anode 5 and removed from the cell through oxygen outlet 10 is maintained as a separate product gas, desirably free of contamination by the fluid feed stock. In the same manner, a relatively pure stream of hydrogen product liberated from cathode 6 and removed from the electrolytic cell through hydrogen outlet 11 is also maintained as a separate product gas, desirably free of feed stock. Although the feed stock inlet is shown in FIGURE 1 at the bottom of a vertical cell and the dried fluid outlet is shown to be at the top of the cell, the process is also operable with these positions reversed or with the fluid flow path extending horizontally through the cell.

The requirement that the diaphragms maintain the oxygen and hydrogen product gases separate and apart not only from admixture therebetween, but also from admixture with the dried fluid product, while permitting the transfer of hydroxyl ions to the anode and protons to the cathode and further permitting the water absorbed by the desiccant from the feed stream in the feed stream channel between the electrodes to migrate to the electrodes imposes certain physical requirements on diaphragms 7 and 8 in order for these diaphragms to operate as indicated. The composition of the material from which the diaphragms are fabricated is the principal variable in their physical properties which accounts for the difference between suitable and unsuitable materials from which the diaphragms may be fabricated. Polymeric material of generally organic composition, such as cellulose, either natural or regenerated, polyvinyl acetate, vinyl chloride-vinyl acetate copolymers, epoxide resins, polyurethanes, polymethacrylates, polyhexamethylene diamine-adipic acid condensation products (under this trade name: nylon), urea-formaldehyde condensation products, phenol-formaldehyde condensation products, sulfonated styrene-divinylbenzene copolymers, and a wide variety of other plastic and resinous materials impregnated with electrolytic salts or containing an electrolytic salt in the matrix of the resin or plastic are utilizable in the preparation of the diaphragm. The material must be of such composition that it does not dissolve or swell in hydrocarbons, so that such polymeric hydrocarbons as polyethylene, polypropylene, polyisobutylene, and polystyrene are in general unsuited for use with hydrocarbon liquid feeds. Since the diaphragm not only serves to transport the hydroxyl anion and the hydrogen cation between electrodes, its electrolytic function is most effectively promoted when the plastic and resinous films from which the diaphragms are fabricated contain polar groups or radicals such as the carboxyl groups of polymethacrylates, the carboxyl and amine groups of hexamethylene diamine-adipic acid polymers, the cyano groups of acrylonitrile polymers, etc., although such resins and plastics need not necessarily contain a polar radical to function in its intended capacity. Although polymers containing such polymer substituents are generally hydrophilic and ion-conductive, the ion-permeability of the membrane is preferably augmented by impregnating it with a conductive salt or by incorporating a finely divided electrolytic salt in the matrix of the resinous or plastic material comprising the diaphragm, especially salts incorporated into the matrix during polymerization of the monomer(s) comprising the diaphragm. The ability of the plastic or resinous diaphragm to transport the hydrogen proton and hydroxyl ion between the spaced electrodes and to simultaneously permit the migration of water from the desiccant in the feed stream channel to the electrodes is referred to herein as "ion-permeability," and characterizes an essential physical property of the resinous or plastic material. Accordingly, plastic and resinous materials which possess ion permeability to a maximum degree are preferred construction materials for the diaphragm.

The electrolytic salt present in the matrix of the diaphragm is preferably incorporated into the monomer or mixture of monomers prior to the resinification or film forming stage in the manufacture of the diaphragm, although such salt particles may also be "pressed" into the plastic diaphragm by passing the sheet material containing an overlay of particles through high pressure rollers, or by impregnation with a salt solution and subsequent evaporation of the solvent, etc. Typical solid electrolytes contemplated herein include such solid salts as sodium chloride, sodium sulfate, calcium sulfate, etc. or, preferably, an electrolyte of the same composition as the desiccant to be utilized in the fluid drying process. Thus, if anhydrous calcium chloride is to be utilized as desiccant in the fluid drying operation, as especially suitable electrolyte salt incorporated into the diaphragm matrix is also calcium chloride, although any electrolytic salt compatible with the chemical composition of the desiccant, such as sodium chloride (when calcium chloride is the desiccant, for example), may also be utilized in the fabrication of the diaphragm. The size of the salt particles utilized in the fabrication of the diaphragm is a variable of substantial importance in the process of fabricating the diaphragm. Since the salt particles provide a bridge for the transport of hydroxyl and proton ions as well as a channel through which water migrates from one side of the membrane to the other, the particles must be of sufficient size to provide exposed surfaces on each side of the membrane. Accordingly, the electrolytic salt particles incorporated into the membrane during fabrication are preferably from 0.1 to about 100 microns in length and more preferably, the maximum linear dimension of the particles is from about 1 to about 50 microns. One method of obtaining uniform distribution throughout the resin or plastic is by mixing the finely divided salt in the monomer prior to polymerization or condensation to form the resin or plastic. An ion-permeable material is formed when such monomer reaction mixture contains from 2 to about 20 percent, and more preferably, from about 5 to about 10 percent by weight of the finely divided salt.

The anode and cathode plates are fabricated from electrically conductive materials which are essentially inert to the desiccant and to the respective gases liberated from the anode and cathode during the electrolysis. Depending upon the chemical composition of the desiccating agent, the electrodes may be metallic, such as copper, cast iron, silver, platinum (particularly for desiccating agents which are highly corrosive) or they may be fabricated from material generally considered non-metallic, such as graphite. The anode and cathode may be alike or unlike in composition.

Most of the voltage drop between the electrodes is caused by the resistance to the flow of current through the desiccant between electrodes and the required voltage impressed on the electrodes varies in direct proportion to the distance between the electrodes. The permissive distance varies with the selection of desiccant, the material from which the diaphragms are fabricated, the size of the desiccant particles, the moisture content of the fluid feed stream and a variety of other factors. Generally, the distance between electrodes should not be in excess of from 3 to about 4 inches, and more preferably, not more than about one inch. As the space between electrodes is reduced to increase efficiency of operation and minimize voltage requirements, the flow rate of the fluid feed stream is limited by the size of the channel formed between the parallel surfaces of the spaced diaphragms.

The flow rate limitation imposed by the space between adjacent parallel diaphragms is relieved and the capacity of the system is enhanced by stacking a number of unit cells side by side within the same enclosure and joining together the effluent streams of common composition from each of the cells in a common header conduit at one end of the fluid flow path, a common header also being provided for the parallel fluid feed inlets and for the multiple oxygen and hydrogen outlets from each of the unit cells of the series. This arrangement is illustrated diagrammatically in FIGURE 2 of the accompanying drawing, which illustrates in an isometric view the internal, parallel arrangement of unit cells, but omits for the sake of clarity of illustration the surrounding enclosure. A portion of the laminated cell structure of the apparatus has been broken away in order to further more clearly illustrate the construction of the serially arranged plates. In such parallel arrangement of unit cells, it is convenient to have one electrode simultaneously serve adjacent cells on each side of the electrode; that is, both surfaces of each elctrode are used to simultanously supply electrical energy to adjacent cells in the series. Thus, moist fluid feed stock enters the process flow through common feed inlet heater 101 and flows simultaneously into a number of parallel feeder lines 102, 103, 104, etc., entering a mass of desiccant particles packed between two substantially parallel, closely spaced diaphragms, feeder line 102 emptying into the mass of desiccant particles between plastic diaphragm sheets 105 and 106. A complete unit cell of the parallel series illustrated in FIGURE 2 is represented by the cell outlined between cathode 109 and anode 110, said cell containing diaphragms 107 and 108, which enclose between the parallel surfaces of these diaphragms a mass of desiccant particles supplied with fluid feed stock through feeder line 103. Anode 110, connected by means of wire 111 to anode buss bar 112, and cathode 109, connected by means of wire 113 to cathode buss bar 114, simultaneously act as anode for the unit cell supplied by feeder line 102 and as cathode, respectively, for the next adjacent unit cell supplied with feed stock by feeder line 104, etc.

As moist feed stock flows into the inlet feeder lines, as aforesaid, dry fluid product is simultaneously withdrawn from the downstream outlet of each element through a series of outlet lines connected in fluid flow relationship to each of the unit cells at one end of the line and to a common dried fluid product header line at the other end of the line. Thus, outlet line 115 connects with the unit cell into which feed stock entered through line 102, line 116 connects with the cell into which feed stock entered through line 103, dry fluid product is withdrawn through line 117 from the cell into which feed stock entered through line 104, etc. All of the dry product outlet lines, from the series of elements, connect with the common dry fluid product header line 118. In a similar manner, outlet lines for the oxygen product on each side of the anode of each cell connect to a common header from which the total oxygen product is withdrawn from the process. Thus, anode 110 produces oxygen in electrolytic cells on each side of the anode and oxygen withdrawn through lines 119 and 120 connect with oxygen header line 121. Hydrogen formed on each side of each of the cathodes is also withdrawn through individual hydrogen outlet lines and intermingle in the common header line. Thus, hydrogen produced in electrolytic cells on each side of cathode 109 is withdrawn respectively through hydrogen outlet lines 122 and 123, the separate streams intermingling in common header line 124, etc.

The electrolyte between the sheets of plastic and the electrodes may be of different composition than the desiccant between the sheets of plastic forming the channel through which the fluid feed stream flows, the former acting as an electrolyte primarily for the conductance of electric current, while the latter acts not only as desiccant but also as an electrolyte for electrical conductance. Thus, particles of an alkali metal hydroxide may be packed in the space between the electrodes and the plastic sheets which form the fluid feed channel and an alkali metal deposited on particles of alumina may be packed as desiccant particles in the channel between the parallel, adjacent plastic sheets, thereby acting simultaneously as desiccant and electrolyte.

Any number of such electrolytic cells may be arranged in parallel within the drying apparatus enclosure, not illustrated, as aforesaid. The number of such individual unit cells arranged in parallel for a given operation will, of course, depend upon the capacity required for the system and the availability of sufficient electrical energy for operating the cells in parallel, as well as the quantity of water present in the fluid feed stream and the dehydrogenation to be effected.

The present invention will be further described with respect to several of its specific embodiments in the following examples which, however, are not intended to limit the variables expressed therein necessarily in accordance with the values set forth for illustrative purposes in the following examples:

Example I

In the following example, air is dried to about 9 p.p.m. of residual moisture prior to its use in the activation of a high-surface sodium catalyst by the direct oxidation of the metallic sodium. Air at 82° F. at atmospheric pressure (14.7 lbs./in.$^2$) and of 60 percent relative humidity is supplied to a drying unit having the form and structure provided in the present invention and embodying the principles shown in FIGURE 1 of the accompanying diagram. The unit is a simplified form of the apparatus illustrated in FIGURE 2 hereof and consists of three "cells" into which the feed stream of moist air is charged at one end of the unit and from which "dry" air containing the aforementioned quantity of water is withdrawn from the other end of the unit.

The drying chamber is essentially an elongated rectangular box, the exterior sides of which constitute the enclosure into which the feed stream is charged. The internal space between the vertical sides of the enclosure is divided into a series of narrow, parallel compartments, extending the entire length of the enclosure and filled with a particulate desiccant material capable of ionizing in aqueous solution, the walls of each compartment being defined by a vertical, rigid divider fabricated from a material which serves a specific purpose in the drying process. From the left to the right side of the rectangular enclosure the parallel dividers are as follows:

Left Wall of Enclosure
    Anode
        Plastic Diaphragm
        Plastic Diaphragm
    Cathode
        Plastic Diaphragm
        Plastic Diaphragm
    Anode
        Plastic Diaphragm
        Plastic Diaphragm
    Cathode
Right Wall of Enclosure The electrodes (anodes and cathodes) are thin sheets of 50 mils thickness of platinum foil stretched and fitted into a rectangular frame which is sealed into the sides of the enclosure. The two anodes are connected together and to the positive pole of a source of direct current (a 12-volt, 90 ampere-hour storage battery) and the cathodes are also interconnected and to the negative electrode of the storage battery. The plastic dividers which are sealed into the end of the enclosure to provide channels extending the length of the enclosure are thin sheets of Mylar (polyester) plastic of 1.5 mils thickness containing 12 percent by weight of powdered sodium chloride crystals (screened to a uniform size of 10–35 microns) uniformly distributed throughout the sheet of plastic when initially polymerized, the sheet of plastic being sealed into the edges of a rectangular frame which fits snugly between the four walls of the enclosure. The ends of each of the plastic dividers are sealed into an internal header at the feed gas inlet and a "dry" product gas header at the outlet end of the enclosure, the feed inlet gas stream thereby being directed to flow into the channels between each pair of parallel sheets of plastic. Since each sheet of plastic is sealed into the feed gas headers at each end of the enclosure, none of the gas enters the channels between the plastic sheets and the electrodes. The channels between the anode and its adjacent, parallel plastic sheet on each side of the anode are sealed into a common header through which oxygen is removed from the unit. The channels between the cathode and the adjacent, parallel plastic sheets on each side of the cathode are separately sealed into a header through which hydrogen is withdrawn as a separate product at the downstream end of the unit.

The parallel sheets of plastic and foil are spaced to provide a channel of 1.45 cm. thickness between the adjacent surfaces of the plastic sheets and channels of 1.5 mm. thickness between the electrode surfaces and the surfaces of the plastic sheets. The unit is 3 inches wide x 5 inches deep x 28 inches long, each of the dividers being approximately 4.5 x 27 inches in size. The channels through which the feed gas stream flows are filled with particles of desiccant of about 30–40 mesh per inch size and the channels between electrodes and the plastic sheets on each side of the electrodes are filled with desiccant particles of 40 to 60 mesh per inch size. Each channel through which feed gas flows contains from 1.75 to 2.8 lbs. of desiccant per channel, depending upon the density of the particular desiccant, which varied from 0.7 to 1.12.

Moist air of the aforementioned water content (60% relative humidity at 82° F., containing 0.001 lbs. water/ft.$^3$ of air) is charged into the drying apparatus at various rates, varying from 1 to 22 ft.$^3$/hr. The consumption of electrical energy varies directly as the moist air feed inlet rate varies. Within the above range of feed inlet rates, the moisture content of the dry air product varied from 5 to 15 p.p.m. depending upon the drying capacity and drying efficiency of the desiccant. Thus, using the commercial desiccant "Drierite" (anhydrous calcium sulfate), the moisture content of the dried air product varied from 9 to 15 p.p.m. as the moist air feed inlet varied from 5 to 15 ft.$^3$/hr. Using magnesium perchlorate, the moisture content of the dried air product varied from 5 to 8 p.p.m. as the moist air feed inlet rate varied from 5 to 20 ft.$^3$/hr.

A relatively refractory adsorbent having slightly ionic properties and a high degree of dying capacity is provided by the commercial product: Linde 4A molecular sieves. When placed in the feed gas channels (i.e. between the sheets of Mylar plastic), the water content of the effluent air product contained from 3 to 10 p.p.m. as the feed gas rate varied from 1 to 10 ft.$^3$/hr. Because of the slower diffusion rate of adsorbed moisture from the sieves, through the plastic divider, through the calcium sulfate on both sides of the electrodes, the drying channel tended to remain more laden with adsorbed water as the drying proceeded.

The rate of production of oxygen and hydrogen (which are recovered in substantially pure form) varies directly as the rate of moisture adsorption from the feed gas in the drying channel.

Example II

Moisture is continuously removed from a stream of moist liquid n-hexane in the following process by charging the feed stream into a drying apparatus similar in design and construction to the unit utilized in Example I, above, except that the particles of desiccant packed between the parallel dividers of plastic film through which the feed stream flows during the drying process consist of activated (calcined) alumina on which a layer of high surface area sodium is deposited, and the plastic films comprise cellulose sheets of 1.5–2 mils thickness impregnated with potassium chloride solution. The preformed particles of desiccant are screened to provide a substantially uniform sample of about 30 mesh per inch. The stream of liquid n-hexane, containing 110 p.p.m. of water is charged at 75° F. and at a flow rate of 1.8 ft.$^3$/hr. into the inlet end of the drying unit and is continuously removed as a "dry" product from the outlet end of the unit as the electrodes are continuously charged with direct current of 12 volts potential difference. The water content of the product stream, which is continuously collected over a period of 6 hours of operation, varies from 4.9 to 5.4 p.p.m. and oxygen and hydrogen are separately recovered in substantially pure form from the anodes and cathodes, respectively.

I claim as my invention:

1. A drying apparatus comprising an enclosure of dielectric material forming an electrolytic cell, a mass of solid, particulate desiccant within said cell, an inlet for moisture-containing fluid at one end of the cell and an outlet for desiccated fluid at the opposite end of the cell, a pair of direct current electrodes in said mass of desiccant and means for impressing thereon a direct current electrical current potential at sufficient electromotive force of electrolyze moisture sorbed by the desiccant from said fluid, means within said cell and mass of desiccant for maintaining the resultant hydrogen and oxygen separated from each other and from the desiccated fluid, a second outlet for hydrogen at said opposite end of the electrolytic cell, and a third outlet for oxygen at said opposite end of the cell.

2. The apparatus of claim 1 further characterized in that said desiccant is anhydrous calcium sulfate.

3. The apparatus of claim 1 further characterized in that said desiccant is a hygroscopic alkali metal salt deposited on the surfce of an essentially inert support.

4. The apparatus of claim 1 further characterized in that the means for maintaining the hydrogen and oxygen separated comprises an ion-permeable polymeric material arranged as a pair of spaced sheets and disposed between said electrodes to form a central channel, a second channel containing the cathode electrode and a third channel containing the anode electrode.

5. The apparatus of claim 4 further characterized in that the second outlet is directly connected to the second channel, the third outlet is directly connected to the third channel and the outlet for desiccated fluid is directly connected to the central channel, each of said channels being sealed from the other channels.

6. The apparatus of claim 4 further characterized in that said polymeric material is a polymerized monomer containing polar radicals.

7. The apparatus of claim 4 further characterized in that said polymeric material contains finely divided particles of an electrolytic salt embedded therein.

8. The apparatus of claim 7 further characterized in that said electrolytic salt is of the same composition as the desiccant.

9. A drying apparatus comprising an enclosure of dielectric material containing a series of electrolytic cells, a mass of solid, particulate desiccant within each of the cells, an anode electrode and a cathode electrode within each cell and means for impressing thereon a direct current potential at sufficient electromotive force to electrolyze moisture sorbed by the desiccant from the fluid to be dried, a pair of ion-permeable sheets of polymeric material within each cell and mass of desiccant and disposed between said electrodes to form a central channel, a second channel containing said cathode and a third channel containing said anode, a moist fluid inlet to the central channel in each cell, a dry fluid outlet from the central channel of each cell, a hydrogen outlet from said second channel of each cell and an oxygen outlet from said third channel of each cell.

10. The apparatus of claim 9 further characterized in that each of the cells in series except the terminal cell is formed by the anode and cathode, a given anode functioning as the anode for two adjacent cells and a given cathode functioning as the cathode for two adjacent cells.

References Cited

UNITED STATES PATENTS

| | | | |
|---|---|---|---|
| 2,830,945 | 4/1958 | Keidel | 204—195 |
| 3,038,853 | 6/1962 | Cole | 204—265 |
| 3,084,113 | 4/1963 | Vallino | 204—130 XR |
| 3,188,283 | 6/1965 | Cole | 204—129 |

JOHN H. MACK, Primary Examiner

D. R. JORDAN, Assistant Examiner

U.S. Cl. X.R.

204—130, 129, 195